United States Patent

[11] 3,571,525

[72] Inventor Jerry W. Miller
Menlo Park, Calif.
[21] Appl. No. 763,641
[22] Filed Sept. 30, 1968
[45] Patented Mar. 16, 1971
[73] Assignee Ampex Corporation
Redwood City, Calif.

[54] PILOT SIGNAL PLAYBACK CLAMPING DURING DROPOUTS TO PREVENT SPURIOUS TIME-BASE ERRORS
5 Claims, 11 Drawing Figs.

[52] U.S. Cl. .......... 179/100.2, 178/6.6
[51] Int. Cl. .......... G11b 5/04, H04n 5/78
[50] Field of Search .......... 179/100.2 (K), (S); 178/6.6, 6.6 (A), (P&SC); 325/348; 329/(Inquired)

[56] References Cited
UNITED STATES PATENTS
3,461,230 8/1969 Hodge et al. .......... 178/6.6
3,356,921 12/1967 Bradford et al. .......... 178/6.6

*Primary Examiner*—Bernard Konick
*Assistant Examiner*—Howard W. Britton
*Attorney*—Robert G. Clay

ABSTRACT: Method and apparatus for sensing tape dropouts in pilot-stabilized magnetic tape recorders and preventing spurious time-base errors. In playback, a level detecting means senses the occurrence of tape dropouts of the recorded signals. Inhibitor means respond to the occurrence of a dropout and the time-base error signal preceding the dropout is held during the dropout interval and for a time thereafter.

INVENTOR.
JERRY W. MILLER
BY Thompson & Schatzel
ATTORNEY

PILOT SIGNAL PLAYBACK CLAMPING DURING DROPOUTS TO PREVENT SPURIOUS TIME-BASE ERRORS

BACKGROUND OF THE INVENTION

The present invention relates to time-base error correction in magnetic tape recording systems and, more particularly, to a method and apparatus for prevention of spurious time-base errors resulting from tape dropouts in pilot-stabilized tape recorders. Pilot-stabilized tape recorders are frequently sued for recording wideband instrumentation and video signals.

In pilot-stabilized tape recorder systems, a pilot tone, derived from a frequency standard, is combined with the intelligence signal before recording on the tape medium. The combined signal is subsequently recorded. A common procedure on playback provides for the tone to be extracted by means of filter, amplified, limited and phase-compared to the frequency standard output. The resulting signal, called the error signal, is used to control the delay of an electronic variable delay line through which the intelligence signal is passed. By this means, time-base correction of the intelligence signal is accomplished.

However, time-base stability is hampered by tape dropouts which cause transients when data are recorded in FM form. This effect is especially detrimental if the data are in digital form. Such dropouts may be due to tape scratches, foreign particles, erroneous recording, head-to-tape separation, etc. When a tape dropout occurs in the pilot tone, noise tends to be amplified by the limiter and phase-compared to the frequency standard, yielding an arbitrary error signal and misadjustment of the delay line. Following the dropout, a time equal to the attack time of the delay line control circuits, plus the delay of the pilot signal filter circuit, must elapse before the intelligence signal (which is also subject to the dropout) will be properly time-base corrected. This effect is especially deleterious when two-channel redundancy recording of frequency modulated signals is used in which signals are redundantly recorded on separate parts of the tape. During the recovery time following a dropout in one-channel, the frequency modulated signal in that channel is misphased relative to the signal in the other channel and may even cancel the latter signal, thereby defeating the principle of redundancy. At the very least, the misphasing will be reflected in an undesirably large timing error in the reproduced output signal. A redundant recording system is disclosed and discusses in U.S. Pat. application 623,864 filed Mar. 17, 1967 by Sidney S. Damron et al., now U.S. Pat. No. 3,497,634.

Even if noise were not amplified sufficiently to operate the phase comparator circuit, a potential problem remains though to a lesser extent. The abrupt loss or reappearance of the pilot tone at the edges of the dropout tends to occasion an incidental phase modulation of the decaying or growing pilot extractor filter output. This incidental modulation tends to cause misadjustment of the delay line at the edges of the dropout and for the above mentioned time following the dropout.

SUMMARY OF THE PRESENT INVENTION

The present invention pertains to an apparatus and method for preventing the spurious time-base errors due to tape dropouts in magnetic tape recorders as above described. Level detecting means are incorporated to sense the occurrence of dropouts, either in the pilot signal or in the intelligence signal. Detection of a dropout results in the generation of a clamping signal to inhibit the reproduced pilot signal from reaching the phase comparator during the pilot dropout interval and preferably for a time interval thereafter. The pilot phase comparator is caused to hold the last value it had preceding the dropout. Thus, the misadjustment of the delay line is minimized. If the frequency modulated intelligence signal is detected to indicate the presence of a dropout, in those cases where the pilot signal is lower in frequency than the intelligence signal, the detected dropout will precede the loss of pilot signal. This is attributable to the fact that the FM signal, having shorter wavelength on tape, is more sensitive to tape defects and to head-tape separation, common causes of dropout. Secondly, the pilot extractor filter delays the pilot signal so that the pilot dropout is delayed relative to the dropout in the intelligence signal. If the end of the indicated dropout is intentionally delayed by a small amount, then the phase comparator can be inhibited during the times of incidental phase modulation at the edges of the dropout. Thus, the apparent time-base shift which occurs at the beginning and at the end of the pilot dropout is prevented from being reflected in the error signal to the delay lines.

DESCRIPTION OF THE PREFERRED EMBODIMENT

Figure 1:
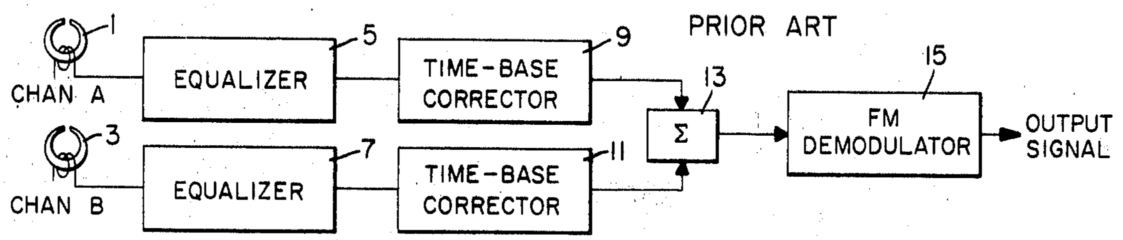
FIG. 1 is a generalized block diagram of a segment of the playback electronics of a digital magnetic tape recorder incorporating redundant recording.

FIG. 1 illustrates a segment of prior art playback electronics for a digital magnetic tape recording system utilizing redundant recording of frequency modulated signals. The recorded signal generally comprises a frequency modulated (FM) intelligence signal with an intelligence component and a pilot tone of a select frequency. The electronics may be viewed as two channels A and B having respective magnetic heads 1 and 3. Except during a tape dropout, the same FM signal appears on each channel. The heads 1 and 3 which serve as transducer means for generating an electrical signal representative of the recorded signal are each tied to an equalizer network 5 and 7, respectively, to equalize the playback frequency response. Time-base corrector networks 9 and 11 extend from the equalizers 5 and 7 to an adder 13 where the redundant signals are combined. The added signals are then demodulated by a frequency demodulator 15. The demodulated intelligence signal is then passed on to processing electronics to recreate the originally recorded data. For a more complete description of a redundant recording system see the previously cited U.S. Pat. No. 3,497,634.

Figure 2:
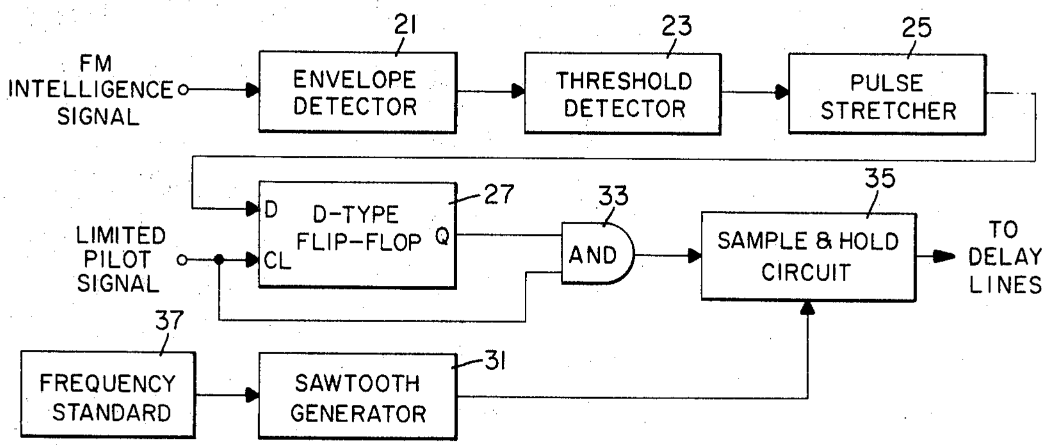
FIG. 2 is a generalized block diagram of a network incorporating the principles of the present invention.

Referring now to FIG. 2, there is depicted in block diagram form a network according to the present invention for receiving a frequency modulated intelligence signal. The network may be viewed as one of the time-base corrector networks 9 and 11 of FIG. 1 receiving the intelligence signal from an equalizer 5 or 7. The network includes an envelope detector 21, a threshold detector 23 and a pulse stretcher 25 tied in cascade and extending to a bistable multivibrator in the form of a flip-flop network 27. The flip-flop 27 also receives a limited pilot signal pulse train originating with the pilot signal component recorded on the tape medium. The output of the flip-flop 27 extends to one terminal of an AND gate 33 which also received receives the limited pilot signal. The output of the AND gate 33 extends to a sample and hold circuit 35 gated by the output of a sawtooth generator 31, synchronized to a frequency standard source 37.

Figures 3A, 3B, 3C, 3D, 3E, 3F, 3G, 3H, 3I:
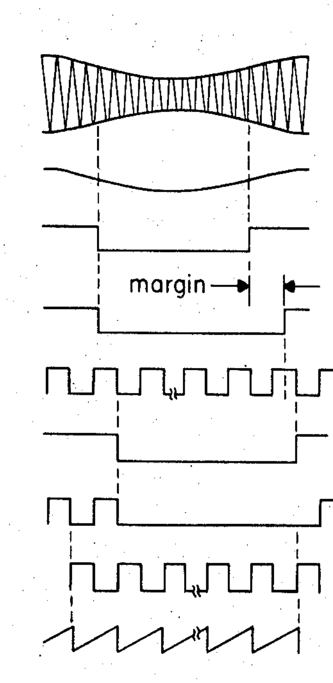
FIGS. 3A—3I are various waveforms illustrating signals at various points in the circuitry of FIG. 2.

THe envelope detector 21 receiving the intelligence signal serves as a means for monitoring the level of the reproduced FM wave and produces a signal proportional to the amplitude of the FM carrier. If a dropout in the intelligence signal occurs, as illustrated by FIG. 3A, the detector 21 output responds by a change in amplitude of the envelope as illustrated by FIG. 3B. The threshold detector 23 serves as a means for generating a clamping pulse signal indicative of a dropout and generates a clamping pulse of a width coinciding with the duration of the dropout as illustrated by FIG. 3C. The pulse stretcher circuit 25 extends the clamping pulse as indicated by the pulse of FIG. 3D, in order to ensure full encompassing of the end of the dropout. The margin of extension is not critical and commonly is in the order of a few microseconds. The stretched clamping pulse is supplied to the input of the flip-flop 27, which may be of the D-type. The flip-flop 27 is clocked by the pulse train of FIG. 3E representative of the limited pilot signal originating with the recorded pilot tone on the magnetic tape medium. In this way the stretched clamping pulse is synchronized to the pilot signal. The output of the flip-flop 27 takes the form of FIG. 3F. The leading and trailing edges of the pulse of FIG. 3F are in phase with a negative going edge of pulses of the clock train of FIG. 3E. The AND gate 33 receives the dropout representative of the flip-flop 27 and pilot signal of FIG. 3E which has been extracted from the tape medium by means of a filter, amplified and limited. The limited pilot signal, as shown by FIG. 3E, is of generally consistent maximum amplitude with zero crossings representative of the time base of the playback transport. The AND gate 33 responds to the pilot signal and dropout representative to provide a train of pulses interrupted by the occurrence of the dropout pulse as depicted by FIG. 3G. The interruption equals an integral number of pilot pulses depending on the length of the dropout. The synchronized dropout pulse from the flip-flop 27 controls an the AND gate 33 to inhibit the passage of the limited pilot signal through the gate 33. The stretching of the clamping pulse and synchronizing it with the pilot pulse signal train assures that there will be a delay after the dropout ends before pilot pulses are transmitted through the gate 33. The AND gate 33 output is received by the sample and hold circuit 35 which serves as a phase comparator and generates an error signal for controlling voltage variable delay lines (not shown) through which the intelligence signal passes. The circuit 35 also receives a reference sawtooth waveform signal from the generator 31 which converts a frequency standard signal of FIG. 3H to one of the form of FIG. 3I. The frequency standard signal is of the same frequency as the pilot signal. At this time it may also be pointed out that synchronizing the flip-flop 27 to the pilot signal aids in preventing the dropout signal representative from the stretcher 25 from occurring so close in time to a sampling pulse so as to cause the sampling phase comparator circuit 35 to malfunction and give a spurious output. The phase error signal from the circuit 35 represents the amplitude of the sawtooth at the time of sampling. In the absence of a sample input from the AND gate, the phase comparator means 35 holds the output level determined by the last uninhibited sample until the reappearance of sample input from the AND gate 33 following the end of the dropout. It may also be pointed out that since the pilot signal filter delays the pilot signal a number of microseconds, the technique of detecting dropouts in the FM signal allows the anticipation of the occurrence of a pilot dropout by the amount of that delay. Thus, the apparent time-base shift which occurs at the beginning and at the end of the pilot dropout is prevented from being reflected in the error signal to the delay lines.

An alternative embodiment would incorporate similar structure to that of FIG. 2 except that the envelope detector would receive the pilot signal. However However, assuming the pilot frequency is less than the FM carrier, the dropout is not anticipated as in the first described embodiment.

I claim:

1. In a magnetic tape recording system of the class wherein a combined pilot signal component and an intelligence signal component are recorded on a medium and on playback said pilot signal component is extracted for comparison with a reference signal to generate an error signal indicative of time-base error between the reference and playback signals, and wherein said pilot signal component is represented by a train of electrical pulses and said reference signal is represented by a periodic sawtooth signal, the combination comprising:

detection means for receiving at least one of said signal components and sensing a predetermined threshold deviation of the amplitude of an envelope of such signal component;

clamping signal generator means connected and responsive to said detection means issuing a clamping signal having a duration substantially coextensive with a detected threshold deviation of the amplitude of the signal envelope;

comparator means for receiving said reference signal and pilot signal component and issuing an error signal representing the phase relationship therebetween, said comparator means having a sample and hold circuit including an input connected to receive said sawtooth signal and another input connected to receive said train of electrical pulses, said circuit being responsive to each such pulse to sample the instantaneous level of said sawtooth signal and to hold such sample level as said error signal for the time intervals between successive pilot signal pulses; and gating circuit means connected between said clamping means and comparator means for inhibiting change of the error signal issued by said comparator means in response to and for the duration of said clamping signal, said gating circuit means having a condition in which said pilot signal pulses are transmitted to said sample and hold circuit of said comparator means and having a condition in response to the occurrence of said clamping signal in which the transmission of such pulses to said sample and hold circuit is interrupted.

2. The combination as defined in claim 1, said gating circuit comprising a multivibrator having an input connected and responsive to said clamping signal generator means and an output issuing a signal representing said conditions of said gating circuit and another input connected to receive said pilot signal component for clocking said multivibrator in response to said pilot signal pulses, and an AND gate having an input connected and responsive to the output of said multivibrator and another input connected to receive the pulses of said pilot signal component and having an output connected to said sample and hold circuit, said AND gate being responsive to the signal issued by said output of said multivibrator to either transmit or interrupt said pilot signal pulses in accordance therewith.

3. The combination as defined by claim 1 wherein at least said intelligence signal component is in frequency modulated form, said detector means being further defined by being connected to receive the frequency modulated intelligence signal component for sensing said predetermined threshold deviation of the envelope amplitude thereof.

4. A method of generating a time-base error signal representative of a phase error between a pilot signal and a frequency standard signal in a recording system wherein the recorded information includes a combined pilot signal component and a frequency modulated intelligence component and wherein said frequency standard signal is represented by a sawtooth waveform signal and said pilot signal is represented by a train of electrical pulses, comprising:

extracting the pilot component from the recorded information and generating an electrical signal representative of such pilot component;

detecting a predetermined threshold deviation of the envelope amplitude of at least one of the components of the recorded information;

generating a clamping pulse signal representative of a detected threshold deviation of amplitude of the envelope of such signal component;

phase comparing the frequency standard signal and the extracted pilot signal component to generate an error signal responsive to a change in phase therebetween, said phase comparing step including sampling the instantaneous level of said sawtooth signal in response to each pilot signal pulse to provide an error signal and holding such sampled levels for the time intervals between successive pilot signal pulses; and inhibiting the step of phase comparing during the existence of a clamping pulse signal and holding the error signal to a level developed at a time preceding such clamping pulse signal, the step of inhibiting comprising interrupting the train of pilot signal pulses in response to and for the duration of said clamping pulse signal.

5. The method of claim 4, further comprising the step of, synchronizing said clamping pulse signal with said pilot signal component such that the leading and trailing edges of the clamping pulse signal are determined by the time times at which pilot signal pulses occur.